US012793294B1

(12) United States Patent
Hasanain et al.

(10) Patent No.: US 12,793,294 B1
(45) **Date of Patent: *Nov. 10, 2026**

(54) DRAWING FUNCTION IDENTIFICATION IN GRAPHICS APPLICATIONS

(71) Applicant: COREL CORPORATION, Ottawa (CA)

(72) Inventors: Yahya Hasanain, Ottawa (CA); Adam Frank Nevraumont, Ottawa (CA)

(73) Assignee: Corel Corporation, Ottawa (CA)

( * ) Notice: Subject to any disclaimer, the term of this patent is extended or adjusted under 35 U.S.C. 154(b) by 177 days.

This patent is subject to a terminal disclaimer.

(21) Appl. No.: 18/788,740

(22) Filed: Jul. 30, 2024

Related U.S. Application Data

(63) Continuation of application No. 18/166,152, filed on Feb. 8, 2023, now Pat. No. 12,056,800, which is a continuation of application No. 16/996,793, filed on Aug. 18, 2020, now Pat. No. 11,605,187.

(51) Int. Cl.

| | |
|---|---|
| ***G06T 11/23*** | (2026.01) |
| ***G06F 18/214*** | (2023.01) |
| ***G06F 40/169*** | (2020.01) |
| ***G06N 3/08*** | (2023.01) |
| ***G06N 20/00*** | (2019.01) |
| ***G06T 11/60*** | (2006.01) |

(52) U.S. Cl.
CPC ............ *G06T 11/23* (2026.01); *G06F 18/214* (2023.01); *G06F 40/169* (2020.01); *G06N 3/08* (2013.01); *G06N 20/00* (2019.01); *G06T 11/60* (2013.01)

(58) Field of Classification Search
CPC ......... G06T 11/23; G06T 11/60; G06N 20/00; G06N 3/08; G06F 40/169; G06F 18/214
See application file for complete search history.

(56) References Cited

U.S. PATENT DOCUMENTS

| | | | | |
|---|---|---|---|---|
| 4,815,029 | A * | 3/1989 | Barker | G06T 11/60 700/83 |
| 5,243,691 | A | 9/1993 | Kuwabara et al. | |
| 5,581,686 | A | 12/1996 | Koppolu et al. | |
| 5,835,919 | A * | 11/1998 | Stern | G06T 11/60 715/764 |
| 5,845,119 | A | 12/1998 | Kozuka et al. | |

(Continued)

OTHER PUBLICATIONS

H. Lu and M. Kowalkiewicz, "Text Segmentation in Unconstrained Hand-Drawings in Whiteboard Photos," 2012 International Conference on Digital Image Computing Techniques and Applications (DICTA), 2012, pp. 1-6, doi: 10.1109/DICTA.2012.6411687. (Year: 2012).

*Primary Examiner* — Charles L Beard
(74) *Attorney, Agent, or Firm* — Rosenberg, Klein & Lee

(57) ABSTRACT

A method and a system to identify and apply drawing functions in graphics applications. The method includes receiving a comment having a suggested drawing change to an object in a document, where the comment includes natural language, and processing the comment to identify a drawing function associated with the suggested drawing change. The method further includes providing a drawing function for presentation to a user, receiving a user request to change a parameter associated with the drawing function, and changing the parameter of the drawing function to perform the suggested drawing change of the object in the document.

10 Claims, 6 Drawing Sheets

(56) References Cited

U.S. PATENT DOCUMENTS 6,088,480 A * 7/2000 Sakamoto ............... G06T 11/60 358/401
6,224,382 B1 5/2001 Steele et al.
6,233,351 B1 * 5/2001 Feeney ................... G06T 11/23 345/522
6,243,172 B1 6/2001 Gauthier et al.
6,262,734 B1 7/2001 Ishikawa
6,377,255 B1 4/2002 Ishikawa
6,401,237 B1 * 6/2002 Ishikawa ................... G06F 8/30 717/113
6,518,989 B1 * 2/2003 Ishikawa ................. G06T 19/00 715/848
6,552,721 B1 4/2003 Ishikawa
7,315,979 B1 1/2008 Walker
7,667,582 B1 2/2010 Waldorf
7,904,876 B1 3/2011 Critz
8,205,161 B2 6/2012 King et al.
8,307,348 B2 11/2012 Krouse et al.
9,037,974 B2 5/2015 Waldman et al.
9,213,471 B2 12/2015 Rose et al.
9,372,858 B1 * 6/2016 Vagell ................... G06F 40/166
10,282,405 B1 5/2019 Silk et al.
10,599,756 B1 3/2020 Mirho
10,733,710 B2 * 8/2020 Chen ....................... G06T 11/23
10,831,452 B1 11/2020 Hunter
10,950,021 B2 * 3/2021 Dubey ................ G06F 16/3329
11,003,308 B1 5/2021 Dryer et al.
11,170,154 B1 * 11/2021 Van Dyke ............. G06F 40/103
11,232,506 B1 * 1/2022 Zielnicki ............ G06Q 30/0631
11,605,187 B1 * 3/2023 Hasanain ............... G06N 20/20
11,935,177 B2 * 3/2024 Ouyang .................. G06T 15/06
11,971,891 B1 * 4/2024 Yu ..................... G06F 16/24545
12,008,026 B1 * 6/2024 Sanz ................... G06F 16/3344
12,106,860 B1 * 10/2024 Guttikonda ............ G16H 50/30
12,169,803 B2 * 12/2024 Garvey ............... G06F 11/3438
12,204,565 B1 * 1/2025 Yu ....................... G06F 16/2471
12,321,862 B1 * 6/2025 Levin ..................... G06N 3/091
12,423,452 B1 * 9/2025 Singh ........................ G06F 8/10
12,561,353 B1 * 2/2026 Donlan ............. G06F 16/33295
12,567,405 B1 * 3/2026 Kumar .................. G06F 40/295
2002/0095231 A1 7/2002 Yu et al.
2002/0196229 A1 12/2002 Chen et al.
2003/0009694 A1 1/2003 Wenocur et al.
2003/0179230 A1 9/2003 Seidman
2004/0083453 A1 4/2004 Knight et al.
2004/0264782 A1 12/2004 McKnight et al.
2012/0141032 A1 * 6/2012 Ouyang ............... G06V 30/347 382/187
2013/0027404 A1 1/2013 Sarnoff
2013/0053996 A1 2/2013 Wu
2013/0124967 A1 5/2013 Hatfield et al.
2014/0096033 A1 4/2014 Blair
2014/0173460 A1 6/2014 Kim
2015/0235097 A1 * 8/2015 Wang ..................... G06V 30/32 382/187
2015/0338939 A1 * 11/2015 Vong ................... G06F 3/03545 345/179
2016/0078773 A1 * 3/2016 Carter ...................... G09B 7/02 434/353
2016/0110900 A1 4/2016 Moosa et al.
2016/0357720 A1 12/2016 Thimbleby
2017/0109933 A1 4/2017 Voorhees et al.
2017/0147537 A1 5/2017 Coker et al.
2017/0169555 A1 * 6/2017 Larocca .............. G06F 3/04817
2017/0354845 A1 12/2017 Williams et al.
2018/0005252 A1 1/2018 Anjo et al.
2018/0095653 A1 * 4/2018 Hasek ................. G06F 3/04883
2018/0107650 A1 * 4/2018 Calvo ................. G06F 3/04883
2018/0109479 A1 * 4/2018 Bahk ....................... H04L 51/10
2018/0150947 A1 * 5/2018 Lu .......................... G06N 3/045
2018/0247357 A1 8/2018 Gaskin et al.
2018/0300301 A1 10/2018 Mikutel et al.
2018/0349020 A1 * 12/2018 Jon ....................... G06F 3/0488
2018/0349514 A1 * 12/2018 Alzate Perez .... G06F 16/90332
2018/0373974 A1 12/2018 Ahn et al.
2019/0138589 A1 5/2019 Udell et al.
2019/0138597 A1 * 5/2019 Dowell ................... G06F 40/35
2019/0266235 A1 8/2019 Northrup et al.
2019/0304157 A1 10/2019 Amer et al.
2019/0370749 A1 * 12/2019 Milvaney ................ G06F 16/93
2019/0377785 A1 * 12/2019 N ............................ G06F 40/20
2019/0392866 A1 * 12/2019 Yoon ...................... G11B 27/28
2020/0167435 A1 5/2020 Chen et al.
2020/0175099 A1 * 6/2020 Ono ....................... G06F 3/0482
2020/0192921 A1 * 6/2020 Satterfield ............. G06F 16/313
2020/0201940 A1 6/2020 Nelson et al.
2020/0285855 A1 9/2020 Brebner
2020/0293604 A1 * 9/2020 Nelson .................. G06F 40/169
2020/0293605 A1 * 9/2020 Nelson .................. G06F 40/117
2020/0293606 A1 * 9/2020 Nelson .................. G06F 40/117
2020/0326841 A1 10/2020 Griffin et al.
2020/0334326 A1 * 10/2020 Zhang ................... G06F 40/169
2020/0356726 A1 11/2020 Nelson et al.
2020/0387550 A1 12/2020 Cappetta et al.
2020/0387567 A1 * 12/2020 Loforte ................... G06F 16/93
2021/0042966 A1 2/2021 Rodgers
2021/0064858 A1 * 3/2021 Batra .................... G06F 18/214
2021/0073285 A1 3/2021 Hunter
2021/0073324 A1 3/2021 Gupta et al.
2021/0075748 A1 3/2021 Agarwal et al.
2021/0158092 A1 5/2021 Seto
2021/0182669 A1 6/2021 Jung et al.
2021/0200612 A1 * 7/2021 Martyanov .......... G06N 3/0499
2021/0248416 A1 8/2021 Navon et al.
2021/0271965 A1 9/2021 Malynin et al.
2021/0303272 A1 9/2021 Yoshida et al.
2021/0304074 A1 * 9/2021 Zaremoodi ......... G06F 16/3329
2021/0334671 A1 10/2021 Minsky et al.
2021/0342122 A1 11/2021 Lee et al.
2021/0344622 A1 11/2021 Mann et al.
2021/0344991 A1 11/2021 Todd
2021/0350125 A1 * 11/2021 Arvela .................. G06F 40/205
2021/0406449 A1 12/2021 Meling et al.
2022/0019736 A1 * 1/2022 Ouyang ................ G06F 40/166
2022/0019932 A1 * 1/2022 Wang ..................... G06N 20/00
2022/0043964 A1 2/2022 Stenerson et al.
2022/0100963 A1 * 3/2022 Anubhai ............... G06F 40/295
2022/0100967 A1 * 3/2022 Pushkin ................ G06F 40/295
2022/0101157 A1 * 3/2022 Huck .................... G06F 40/289
2022/0108082 A1 * 4/2022 Morris .................. G06F 16/382
2022/0172413 A1 * 6/2022 Lee .......................... G06F 3/011
2022/0222047 A1 7/2022 Todirel et al.
2022/0222431 A1 * 7/2022 Zionpour ............. G06Q 10/101
2022/0230370 A1 * 7/2022 Duffy ...................... G06T 11/10
2022/0245341 A1 * 8/2022 Kedia ................... G06F 40/284
2022/0310075 A1 * 9/2022 Lee ....................... G06F 40/216
2022/0317978 A1 10/2022 Barik et al.
2022/0317979 A1 10/2022 Araujo Soares et al.
2022/0334857 A1 10/2022 Lam et al.
2022/0365993 A1 * 11/2022 Voisin ................. G06F 16/9535
2022/0366713 A1 * 11/2022 Humbert .......... G06V 30/19147
2022/0391592 A1 * 12/2022 Klein .................... G06F 16/953
2023/0054663 A1 * 2/2023 Wu ........................ G06N 20/00
2023/0214368 A1 * 7/2023 Ye ......................... G06F 16/211 707/692
2023/0214515 A1 * 7/2023 Ye ........................... G06F 18/22 726/26
2023/0222281 A1 * 7/2023 Shin ...................... G06F 40/169 704/9
2023/0259786 A1 * 8/2023 Esmaeilzadeh ........ G06N 3/094 706/25
2023/0267337 A1 * 8/2023 Esmaeilzadeh ........ G06N 3/047 706/15
2023/0283580 A1 * 9/2023 Rodriguez ............. G06Q 10/40 709/206
2023/0306206 A1 * 9/2023 Dutta ...................... G06F 40/30
2023/0419032 A1 * 12/2023 Bathiche ............... G06F 40/171
2024/0020116 A1 * 1/2024 Chen ........................ G06N 3/08
2024/0028350 A1 * 1/2024 Sharma ............... G06F 3/04855
2024/0089405 A1 * 3/2024 Deng ..................... H04N 7/147
2024/0096017 A1 * 3/2024 Gao ........................ G06T 15/04
2024/0096064 A1 * 3/2024 Li .......................... G06N 3/045
2024/0211504 A1 * 6/2024 Jeong .................... G06F 16/353

(56) References Cited

U.S. PATENT DOCUMENTS

2024/0256773 A1* 8/2024 Correia Ribeiro .... G06F 40/166
2024/0281594 A1* 8/2024 Rao ........................ G06F 40/166
2024/0282295 A1* 8/2024 Borochkin .............. G10L 15/18
2024/0346803 A1* 10/2024 Saraee .................. G06F 16/438
2024/0402692 A1* 12/2024 Sheppard-Guzelaydin ................. G05B 19/41875
2024/0402999 A1* 12/2024 Chen ......................... G06F 8/30
2025/0077776 A1* 3/2025 Anderson ............. G06F 40/284
2025/0088686 A1* 3/2025 Ary ...................... H04N 21/858
2025/0094720 A1* 3/2025 Musundi ................. G06F 40/30
2025/0104392 A1* 3/2025 Saraee .................. G06F 16/438
2025/0110461 A1* 4/2025 Javardi ................ G05B 19/042
2025/0123814 A1* 4/2025 Mcmorran ............. G06N 3/044
2025/0156633 A1* 5/2025 Auchar .................. G06N 3/084
2025/0165650 A1* 5/2025 Rahimov ............ G06F 21/6254
2025/0208844 A1* 6/2025 Yu ............................. G06F 8/60
2025/0217028 A1* 7/2025 Rao ..................... G06F 3/04883
2025/0217588 A1* 7/2025 Ramos .................. G06F 3/0484
2025/0258996 A1* 8/2025 Fang ........................ G06F 40/14
2025/0272317 A1* 8/2025 Aggarwal ........... G06F 16/3329
2025/0284815 A1* 9/2025 Ball ........................ G06N 20/20
2025/0321994 A1* 10/2025 Chen ................. G06F 16/33295
2025/0328997 A1* 10/2025 Zhou ......................... G06T 5/77
2025/0335760 A1* 10/2025 Kalamkar .............. G06N 20/00
2025/0356256 A1* 11/2025 Walter ................... G06N 20/00
2025/0371253 A1* 12/2025 Sancheti ............... G06F 40/169
2025/0372241 A1* 12/2025 Synghal ................. G16H 40/20
2025/0380035 A1* 12/2025 Hurley ............... H04N 21/8133
2025/0390498 A1* 12/2025 Turrell .............. G06F 16/24556
2026/0006053 A1* 1/2026 Ahmad ................... G06F 21/55
2026/0030495 A1* 1/2026 Kim ......................... G06N 3/08
2026/0037865 A1* 2/2026 He ......................... G06N 20/00
2026/0065060 A1* 3/2026 Kutt ....................... G06N 3/084
2026/0073316 A1* 3/2026 Gollhofer ................. G06F 8/10
2026/0134660 A1* 5/2026 Saraee .................. G06F 16/438
2026/0178472 A1* 6/2026 Kim .................... G06F 11/3688

* cited by examiner

DRAWING FUNCTION IDENTIFICATION IN GRAPHICS APPLICATIONS

CROSS-REFERENCE TO RELATED APPLICATIONS

This patent application claims the benefit of priority as a continuation of U.S. patent application Ser. No. 18/166,152 filed Feb. 8, 2023; which itself claims the benefit of priority as a continuation of U.S. patent application Ser. No. 16/996,793 filed Aug. 18, 2020 which has issued as U.S. Pat. No. 11,605,187; the entire contents of which are incorporated herein by reference.

TECHNICAL FIELD

The instant specification generally relates to improving functionality of graphics applications. More specifically, the instant specification relates to identifying and applying drawing functions in graphics applications.

BACKGROUND

Collaboration brings people and ideas together to complete tasks and achieve goals. Computer applications use collaborative tools to improve collaboration within an application. Collaborative tools enable the sharing, processing, and management of files, documents, and other data types among several user and/or systems. Collaboration tools often utilize comments as a medium for transferring collaborative data and information. Comments can include input, feedback, suggestions, or a log of recent actions taken within a document or file. Users (e.g. collaborators, contributors, reviewers, etc.) can generate comments and send them to other users to be viewed, acted upon, and/or responded to. Comments allow users to collaborate on various types of files such as files associated with word processing, drawing, graphical, video, and audio applications.

BRIEF DESCRIPTION OF THE DRAWINGS

Aspects and implementations of the present disclosure will be understood more fully from the detailed description given below and from the accompanying drawings, which are intended to illustrate aspects and implementations by way of example and not limitation.

DETAILED DESCRIPTION

Figure 1:
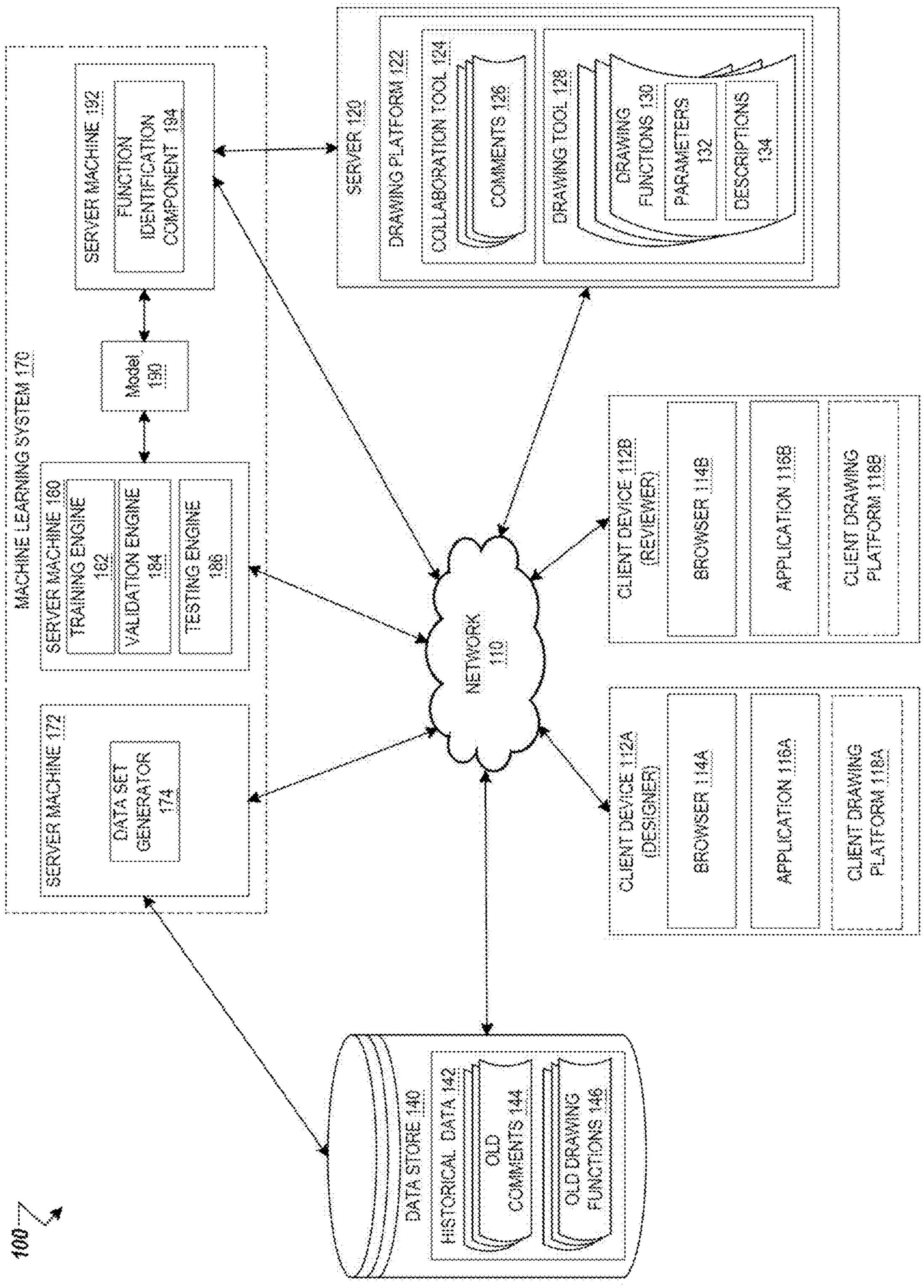
FIG. 1 is a block diagram illustrating an exemplary system architecture in which implementations of the disclosure may operate.

A drawing platform may comprise numerous drawing functions to implement many layers of drawing functionality. For example, drawing platforms can include drawing functions that affect the presentation of objects within a drawing workspace. Drawing functions make use of drawing parameters to adjust the way objects (e.g. shapes, pictures, drawings, etc.) are displayed. For example, drawing functions can change parameters associated with the size, color, or texture of an object. In another example, drawing functions, used alone or in combination, can create artistic rendering, graphical designs, layered drawings, and the like. A drawing platform may include a diverse portfolio of drawing functions to provide many options for users to create. A drawing platform often uses unique names and descriptions associated with the functionality of each of the drawing functions. Due to the large quantity of drawing functions, a drawing platform organizes and encapsulates these drawing functions in various levels of menus and displays.

Along with drawing functionality, a drawing platform may also include a collaboration workflow that allows users to provide input (e.g. feedback, suggested changes, or the like) through comments. For example, a user (e.g. a collaborator, a reviewer, or the like) may provide input to another user (e.g. a designer, or editor, or the like) that suggests a change to a drawing document. To apply the suggested change, the user receiving the comment may identify the suggested change from the comment and determine which of the one or more drawing functions to use. The user may then locate and access the determined drawing function from the various levels of menus and displays. After the user applies the change, the user may prepare a response to indicate successful application of the suggested change. This process can slow down progress on collaborated projects that use a drawing platform. For example, to apply a suggested change, a user with little to no experience with a drawing platform may not know which drawing function to use. In another example, a user may know the type or name of the drawing function but might not know where to find the drawing function within the menus and displays. In another example, a user may not know the best drawing function to use to apply the suggested drawing change and, thus, may apply a drawing function that does not adequately satisfy the suggested drawing change.

Aspects and implementations of the present disclosure address these and other shortcoming of the existing technology by identifying drawing functions associated with suggested changes within comments and providing a presentation of the drawing functions to a user. Initially, the drawing platform may receive a comment that includes a suggested drawing change to an object in a document. The drawing platform may process the comment to identify a drawing function associated with the suggested drawing change. The drawing platform may further provide the drawing function for presentation to a user. The drawing function may include a plurality of parameters. The drawing platform may receive a user request to change a parameter of the plurality of parameters of the drawing function, where the parameter corresponds to the suggested drawing change of the object in the document. The drawing platform may change the parameter of the drawing function to perform the suggested drawing change of the object in the document.

The drawing platform may use the suggested drawing change as input to a machine learning model to obtain one or more outputs. The one or more outputs of the machine learning model may indicate (i) a drawing function associated with the suggested drawing change, and (ii) a level of confidence that the drawing function is associated with the suggested drawing change. The drawing platform may then identify the drawing function by determining that the level of confidence for the drawing function satisfies a threshold condition.

Aspects of the present disclosure result in technological advantages of significant reduction in energy consumption (e.g. battery consumption), bandwidth, latency, and so forth. In some embodiments, the technological advantages may result from providing a drawing function associated with a suggested drawing change to a user without the user having to search and explore through menus and displays of the drawing platform. In some embodiments, identifying drawing functions associated with suggested drawing changes provides an increased accuracy to drawing function selection. For example, a user with little to no experience with the drawing platform will be presented with a drawing function that will, with a degree of confidence above a threshold value, correspond to the suggested drawing change. Thus, the collaboration workflow can move forward without requiring correction from selecting a drawing function that inadequately applies the suggested drawing change. In another example, a moderately experienced user may be presented with a drawing function that more efficiently applies the suggested drawing change. In another example, a user may learn and discover more drawing functions and additional features of the drawing platform.

FIG. 1 is a block diagram illustrating an exemplary system architecture 100 in which implementations of the disclosure may operate. The system architecture 100 includes one or more client devices 112 (e.g., 112A, 112B, etc.), a server 120, a data store 140, and a machine learning system 170. The machine learning system 170 may be part of the server 120. In some embodiments, one or more components of the machine learning system 170 may be fully or partially integrated into client devices 112.

The client devices 112, server 120, data store 140, and machine learning system 170 may be coupled to each other via a network 110 for identifying drawing functions associated with suggested drawing changes of objects and providing a presentation of the drawing function to the user. In some embodiments, network 110 is a public network that provides client devices 112 with access to the server 120, data store 140, machine learning system 170 and other publicly available computing devices. In some embodiments, network 110 is a private network that provides client device 112 with access to the server 120, data store 140, machine learning system 170, and other privately available computing devices. Network 110 may include one or more wide area networks (WANs), local area networks (LANs), wired network (e.g. Ethernet network), wireless networks (e.g., an 802.11 network or a Wi-Fi network), cellular network (e.g., a Long Term Evolution (LTE) network), routers, hubs, switches, server computers, and/or a combination thereof.

The client devices 112 may be or include any personal computers (PCs), laptops, mobile phones, tablet computers, netbook computers, network connected televisions ("smart TV"), network-connected media players (e.g., Blu-ray player), a set-top-box, over-the-top (OTT) streaming devices, operator boxes, etc. The client devices 112 may include a browser 114, an application 116, and a client drawing platform 118. In some embodiments, the client devices 112 may be capable of accessing the server 120 through the network 110 using the browser 114 or application 116 and communicating (transmitting and receiving) instructions with a drawing platform 122 on the server 120.

In some embodiments, the drawing platform may be downloaded and/or stored fully or partially on the client devices as a client drawing platform 118 (e.g., client drawing platforms 118A and 118B on the respective client devices 112A and 112B). The client drawing platform 118 may include all or some of the functionality of the drawing platform 122 on the server 120. For example, the drawing platform 122 may include graphical drawing functions (e.g. rendering drawing objects) as well as include computational functions (e.g. identifying a drawing function associated with a suggested drawing change). In one example, the graphical drawing functions may be executed on the client devices 112 by the client drawing platform 118 and the computational functions may be executed by the drawing platform 122 on the server 120. In another example, the functions of a drawing tool 128 may be carried out on the client devices 112 by the client drawing platform 118 and a collaboration tool 124 may be carried out by the drawing platform 122 of the server 120. The client devices 112 may communicate with the server 120 through the network 110 to transmit and receive instructions.

In some embodiments, a client device 112A may be associated with a designer and another client device 112B may be associated with a reviewer. For example, the designing client device 112A may be configured to receive one or more comments 126 from the collaboration tool 124 or comments from a client drawing platform 118B of the reviewing client device 112B. The reviewing client device 112B may be configured to receive a drawing document from the designing client device 112A or from the drawing platform 122 of the server 120. In some embodiments, the configuration of the client device 112 may determine the functionality provided to the client device 112. For example, the client drawing platform 118B of the reviewing client device 112B may be configured to only perform functions related to reviewing a drawing document. In another example, the client drawing platform 118B of the reviewing client device may be configured to only perform functions associated with the collaboration tool 124 and may be incapable of performing functions associated with the drawing tool 128. In some embodiments, the client devices 112 may exchange (e.g., transmit and receive) comments via the network 110 without involvement of the server 120.

In some embodiments, only one client device 112A may be used. The client device 112A may transmit a comment including a suggested drawing change (e.g., a change that a user of the client device 112A desires to make), via the network 110, to the server 120. The client device 112A may subsequently receive a presentation of a drawing function associated with the suggested drawing change from the server 120. In this example, the client device 112A may communicate with the server 120 without using a second client device. In some embodiments, a client drawing platform 118 may receive a comment with a suggested drawing change, identify a drawing function associated with the suggested drawing change, and provide the suggested drawing change to the user without the use of another client device (e.g., 112B), the network 110, and/or the server 120.

Server 120 may include one or more computing devices such as a rackmount server, a router computer, a server computer, a personal computer, a mainframe computer, a laptop computer, a tablet computer, a desktop computer, etc.

The server 120 may include a drawing platform 122 comprising a collaboration tool 124 and a drawing tool 128.

The collaboration tool 124 may include a plurality of comments 126. The comments 126 may use natural language. In some embodiments, the comments may include collaborative communications (e.g., reviewer feedback, recommended changes, history of changes, etc.). In some embodiments, the collaboration tool 124 attaches or associates a comment 126 to a drawing document of the drawing platform 122. In some embodiments, the collaboration tool 124 associates a comment 126 with an object of a drawing document. For example, the collaboration tool 124 may include an indicator (e.g., an arrow, highlight, shape, etc.) to show that a comment 126 is referring to a particular object or location within a drawing workspace of the drawing document. In some embodiments, the collaboration tool 124 may display comments 126 on top of objects or on a portion of a drawing workspace. For example, a comment 126 may include "make this green" and the comment 126 may be located near an object to indicate that the comment is associated with the object. In some embodiments, the collaboration tool 124 associates multiple comments together. For example, the collaboration tool 124 may associate a first comment with a second comment, where the second comment is a reply to the first comment or vice versa.

The drawing tool 128 may include a plurality of drawing functions 130 each having one or more parameters 132 and being associated with a description 134. The drawing functions 130 may include instructions to perform drawing operations within a drawing workspace. For example, a drawing function 130 may include instructions to generate, edit, or delete an object. In another example, a drawing function 130 may include instructions that alter parameters of the drawing workspace (e.g., workspace layout, background specification, drawing layers, etc.).

In some embodiments, the drawing platform 122 may include menus and displays to organize drawing functions 130. In some embodiments, the drawing functions 130 may include a plurality of parameters. For example, a drawing function associated with editing a color of an object may include a first parameter associated with a fill color, a second parameter associated with a border color, a third parameter associated with a color texture, and a fourth parameter associated with a color transparency.

In some embodiments, the drawing functions 130 may be associated with descriptions 134 that include natural language explanations of the drawing operations performed by an associated drawing function 130. For example, a drawing function description may include "edits the fill color of an object." In some embodiments, the drawing function 130 may include keywords associated with a drawing operation. For example, a drawing function description may include "darker, lighter, red, pink, maroon, etc." for a drawing function associated with selecting a color or darkness of an object.

Data store 140 may be a memory (e.g., random access memory), a drive (e.g., a hard drive, a flash drive), a database system, or another type of component or device capable of storing data. Data store 140 may include multiple storage components (e.g., multiple server computers). The data store 140 may store one or more historical data 142 including old comments 144 and old drawing functions 146. The old comments may include comments previously used in a collaboration tool 124. The old drawing functions 146 may include one or more drawing functions used in a drawing tool in response to receiving one of the old comments 144. In some embodiments, the old comments 144 may be stored with mapping data that associates each old comment 144 with one or more old drawing functions 146. In some embodiments, the old drawing functions 146 are associated with descriptions (e.g. description 134).

The machine learning system 170 may include one or more computing devices such as a rackmount server, a router computer, a server computer, a personal computer, a mainframe computer, a laptop computer, a tablet computer, a desktop computer, etc. The machine learning system 170 may include a function identification component 194. In some embodiments, the function identification component 194 may use historical data 142 to identify a drawing function associated with a suggested drawing change of an object found in a comment. In some embodiments, the function identification component 194 may use a trained machine learning model 190 to identify a drawing function associated with a suggested drawing change of an object found in a comment. The trained machine learning model 190 may use historical data to identify the drawing function associated with the suggested drawing change.

In some embodiments, the machine learning system 170 further includes server machine 172 and server machine 180. The server machine 172 and 180 may be one or more computing devices (such as a rackmount server, a router computer, a server computer, a personal computer, a mainframe computer, a laptop computer, a tablet computer, a desktop computer, etc.), data stores (e.g., hard disks, memories databases), networks, software components, or hardware components.

Server machine 172 may include a data set generator 174 that is capable of generating data sets (e.g., a set of data inputs and a set of target outputs) to train, validate, or test a machine learning model. The data set generator 174 may partition the historical data 142 into a training set (e.g., sixty percent of the historical data, or any other portion of the historical data), a validating set (e.g., twenty percent of the historical data, or some other portion of the historical data), and a testing set (e.g., twenty percent of the historical data). In some embodiments, the function identification component 194 generates multiple sets of training data. For example, one or more sets of training data may include each of the data sets (e.g., a training set, a validation set, and a testing set).

Server machine 180 includes a training engine 182, a validation engine 184, and a testing engine 186. The training engine 182 may be capable of training a machine learning model 190 using one or more old comments 144 and old drawing functions 146 of the historical data 142 (of the data store 140). The training engine 182 may generate multiple trained machine learning models 190, where each trained machine learning model 190 corresponds to a distinct set of features of each training set.

The validation engine 184 may determine an accuracy of each of the trained machine learning models 190 based on a corresponding set of features of each training set. The validation engine 184 may discard trained machine learning models 190 that have an accuracy that does not meet a threshold accuracy. The testing engine 186 may determine a trained machine learning model 190 that has the highest accuracy of all of the trained machine learning models based on the testing (and, optionally, validation) sets.

In some embodiments, the training data is provided to train the machine learning model 190 such that the trained machine learning model is to receive a new comment that includes a suggested drawing change as a new input and to produce a new output based on the new input, the new output indicating a new drawing function corresponding to the suggested change of the new comment.

The machine learning model 190 may refer to the model that is created by the training engine 182 using a training set that includes data inputs and corresponding target output (correct answers for respective training inputs). Patterns in the data sets can be found that map the data input to the target output (correct answer), and the machine learning model 190 is provided mappings that captures these patterns. The machine learning model 190 may use one or more of logistic regression, syntax analysis, decision tree, or support vector machine (SVM). The machine learning may be composed of a single level of linear of non-linear operations (e.g., SVM) and/or may be a neural network.

Function identification component 194 may provide current data (e.g., a comment 126 comprising a suggested drawing change) as input to trained machine learning model 190 and may run trained machine learning model 190 on the input to obtain one or more outputs including an identified drawing functions of the plurality of drawing functions 130. The function identification component 194 may be capable of identifying confidence data from the output that indicates a level of confidence that one or more drawing functions 130 are associated with the suggested drawing change of an object within the comment 126.

The confidence data may include or indicate a level of confidence of one or more drawing functions 130 being associated with a suggested drawing change of the comment 126. In one non-limiting example, the level of confidence is a real number between 0 and 1 inclusive, where 0 indicates no confidence of the one or more drawing functions and 1 represents absolute confidence in the drawing functions 130.

For purpose of illustration, rather than limitation, aspects of the disclosure describe the training of a machine learning model and use of a trained learning model using information pertaining to historical data 142. In other implementation a heuristic model or rule-based model is used to identify a drawing function 130.

In some embodiments, comments 126 are used as inputs to the machine learning model 190. In some embodiments, contents of comments may be analyzed and converted into other representations of the suggested comments. For example, the comments may be parsed to extracts noun and verbs that are used as input to the machine learning model 190. For example, a comment may comprise “make the circle bigger” or “make the square more red.” The comment may be parsed for key words like “circle” and “bigger” or “square” and “red” which may be used as input to the machine learning model 190 to identify associated drawing functions 130.

In some embodiments, drawing functions 130 may comprise descriptions 134 that include explanations of the functionality of the associated drawing function 130. The descriptions 134 may include natural language and/or keyword identifiers. In some embodiments, the machine learning model 190 receives descriptions 134 as inputs to identify which drawing functions 130 are associated with a suggested drawing change.

In some embodiments, the drawing platform 122 analyzes comments 126 to form syntax trees that includes a data representation indicative of a frequency of words or relationship between words of a comment 126. For example, the drawing platform 122 may convert contents of a comment into a vector representation that indicates the usage, frequency, and relationship between words of the comment. The drawing platform 122 may generate a vector representation of each drawing function description 134 and compare the vector representations of the drawing functions to a vector representation of a comment 126. In some embodiments, the machine learning system 170 using server machine 172, server machine 180, or server machine 192 may generate a vector representation of comments 126 or drawing functions 130. In some embodiments, the machine learning system 170 may receive the vector representation of the comments 126 and drawing functions 130 as inputs, generated by the drawing platform 122, to be used by the machine learning model 190 to identify an associated drawing function 130.

In some embodiments, the functions of client devices 112, server 120, data store 140, and machine learning system 170 may be provided by a fewer number of machines than shown in FIG. 1. For example, in some embodiments server machines 172 and 180 may be integrated into a single machine, while in some other embodiments server machine 172, 180, and 192 may be integrated into a single machine. In some embodiments, the machine learning system 170 may be fully or partially provided by server 120. In some embodiments, the machine learning model 190 or function identification component 194 may be integrated into and/or implemented by the drawing platform 122 or client drawing platform 118.

In general, functions described in one embodiment as being performed by client device 112, data store 140, and machine learning system 170 can also be performed on server 120 in other embodiments, if appropriate. In addition, the functionality attributed to a particular component can be performed by different or multiple components operating together.

In embodiments, a “user” may be represented as a single individual. However, other embodiments of the disclosure encompass a “user” being an entity controlled by multiple users and/or an automated source. For example, a set of individual users federated as a group of administrators may be considered a “user.”

Figure 2:
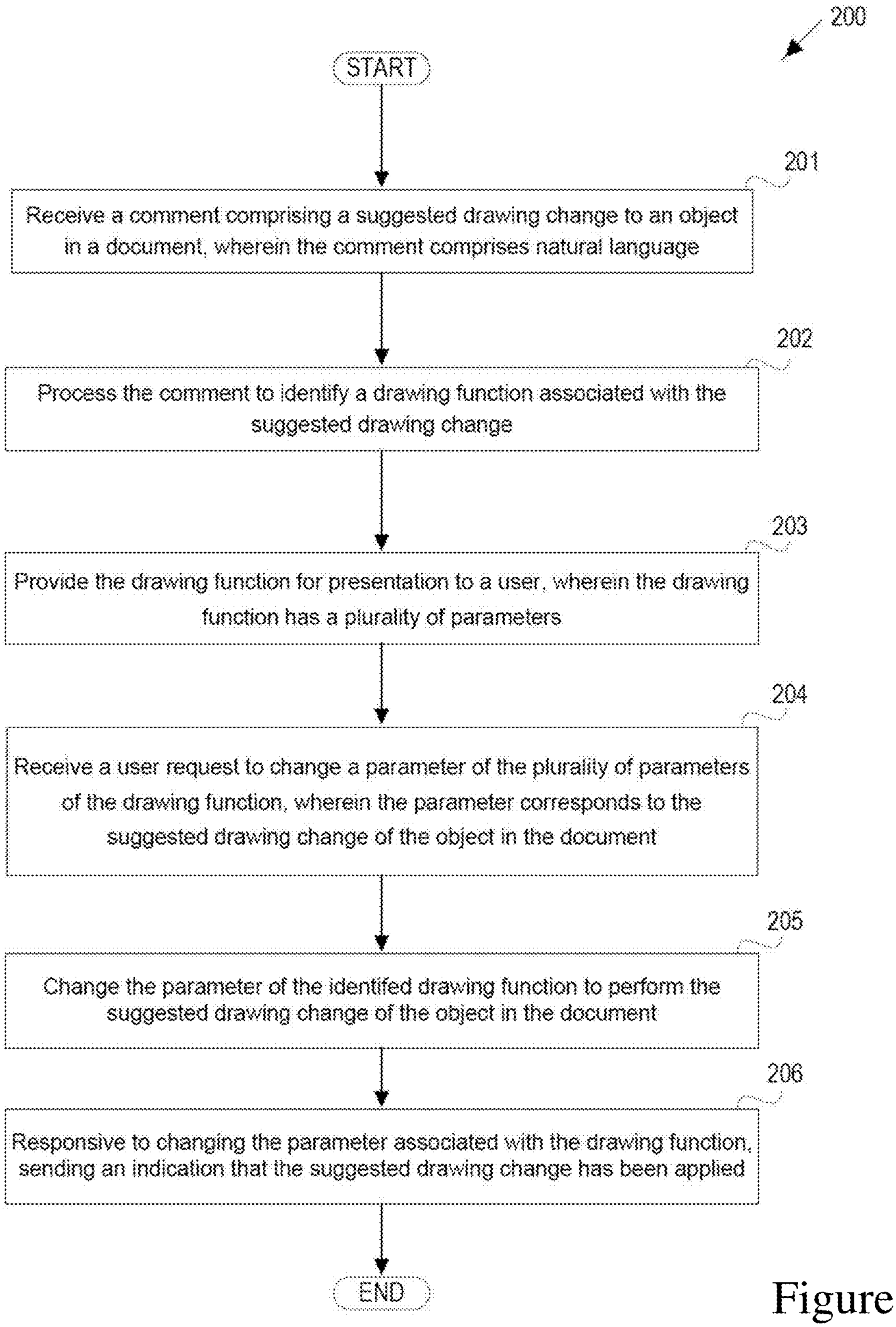
FIG. 2 depicts a flow diagram of one illustrative method of identifying a drawing function associated with a suggested drawing change, in accordance with some implementation of the present disclosure.
Figure 3:
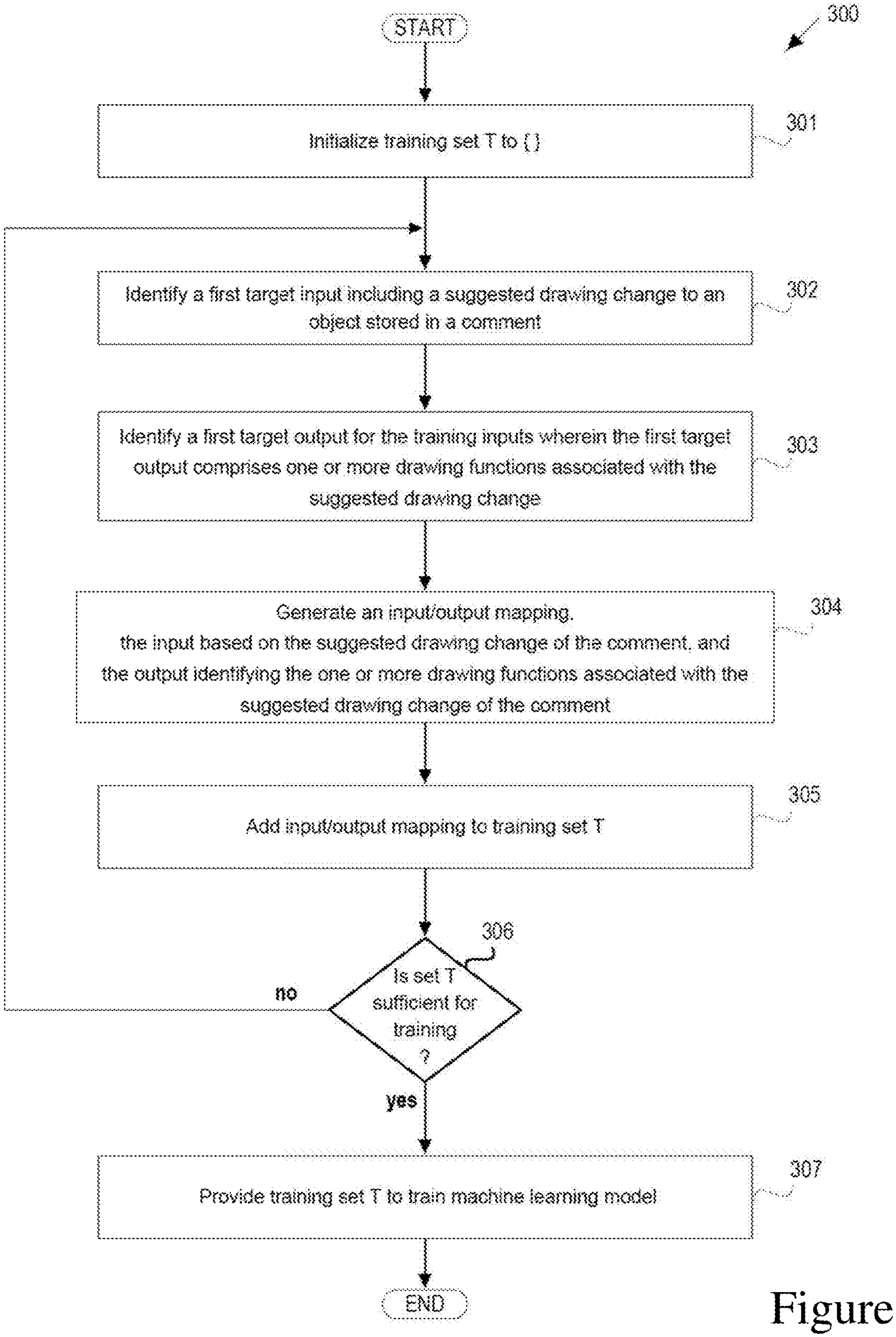
FIG. 3 is an exemplary illustration of a training phase of a machine learning system, in accordance with some implementation of the present disclosure.
Figure 4:
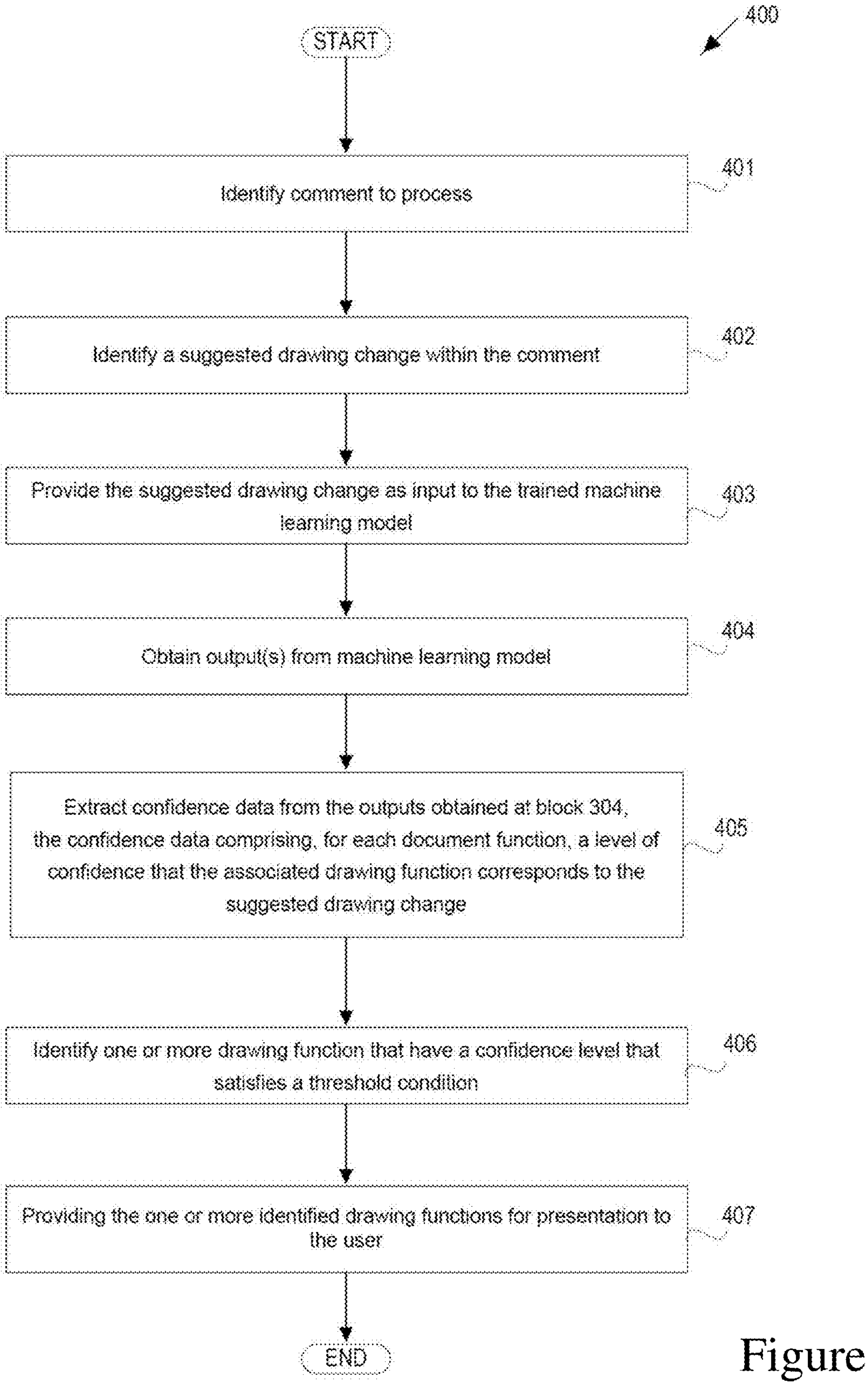
FIG. 4 depicts a flow diagram of one example method for processing suggested drawing changes to identify drawing functions associated with the suggested drawing change using a trained machine learning model, in accordance with some implementation of the present disclosure.

FIGS. 2-4 depict flow diagrams illustrating example methods 200-400 related to identifying drawing functions associated with suggested drawing changes, in accordance with some implementation of the present disclosure. For simplicity of explanation, methods 200-400 are depicted and described as a series of acts. However, acts in accordance with this disclosure can occur in various orders and/or concurrently and with other acts not presented and described herein. Furthermore, not all illustrated acts may be performed to implement the methods 200-400 in accordance with the disclosed subject matter. In addition, those skilled in the art will understand and appreciate that methods 200-400 could alternatively be represented as a series of interrelated states via a state diagram or events.

FIG. 2 depicts a flow diagram of one illustrative method 200 of identifying a drawing function associated with a suggested drawing change, in accordance with some implementation of the present disclosure.

Referring to FIG. 2, at block 201 the processing logic receives a comment (e.g., comment 126 of FIG. 1) comprising a suggested drawing change to an object in a document. The comment may include natural language. The comment may be received from a client device (e.g., client device 112 of FIG. 1) or a server (e.g., server 120 of FIG. 1). The comment may be associated with a drawing document or drawing object. For example, the comment may include a suggested change such as “make this larger” and be associated with an object such a shape. In some embodiments, the comment may include multiple suggested changes. In some embodiments, the comment may include natural language that does not amount to a suggested change (e.g. general feedback such as “looks good”).

At block 202, the processing logic processes the comment to identify a drawing function associated with the suggested drawing change. In some embodiments, the processing logic processes the comment using the suggested drawing change of the comment as input to a machine learning model. The processing logic may obtain one or more outputs of the machine learning model (e.g., machine learning model 190 of FIG. 1). The one or more outputs may indicate (i) the drawing function associated with the suggested drawing change, and (ii) a level of confidence that the drawing function is associated with the suggested drawing change. The processes logic may determine that the level of confidence for the drawing function satisfies a threshold condition (e.g., that the level of confidence is at or above a threshold value).

At block 203, the processing logic provides the drawing function for presentation to a user. The user may be the same user who suggested the drawing change (e.g., a designer). In other instances, the user who is provided the drawing function may be a designer whereas the user who suggested the drawing change may be a reviewer (or some other user), who operates using a different client device. In some embodiments, the drawing functions comprises a plurality of parameters (e.g., parameters 132 of FIG. 1). A plurality of parameters of each of the drawing functions may include values or data that the respective drawing function may alter. In some embodiments, the plurality of parameters includes values or data associated with an object, while in other embodiments the plurality of parameters may include values or data associated with a drawing workspace where objects are used. For example, a parameter may be a size, color, font, location, etc. of an object while in another example, a parameter may be the color, layout, page orientation, layer data of a drawing workspace where objects may be used. In some embodiments, the parameters may include other functionality associated with a drawing document of a drawing platform.

In some embodiments, the processing logic provides the drawing function for presentation to a user by providing a user interface (UI) that displays the drawing function. The UI may comprise a UI component to receive input from the user to adjust one of the plurality of parameters of the drawing function. The UI component may include an interactive feature specific to an associated parameter. For example, a parameter may include a color and a UI component may include a color picker that present various colors for a user to select between. In another example, a parameter may include a size and a UI component may include a slider that a user may change to increase or decrease the size of an associated object. In another example, a parameter may include a font, and a UI component may include a popup box the presents multiple options (e.g., multiple fonts) for a user to select between. In some embodiments, presenting the drawing function to the user includes displaying a preview of the drawing function applied to an associated object or workspace.

In some embodiments, providing a presentation of the drawing function to the user may include presenting the drawing function in a list of multiple drawing functions. For example, the processing logic may present the drawing function in a ranked list that includes one or more other drawing functions. In some embodiments, the processing logic may sorts the list in order of confidence.

At block 204, processing logic receives a user request to change a parameter of the plurality of parameters of the drawing function, where the parameter corresponds to the suggested drawing change of an object in the document. In some embodiments, the user request is received when a user accepts a previewed change in a drawing document. In some embodiments, processing logic receives a result of a user interaction with a UI component (e.g., color picker, slider, popup box, etc.). In some embodiments, processing logic receives and applied change to a drawing document using a drawing function associated with the suggested change.

At block 205, processing logic changes the parameter of the identified drawing function to perform the suggested drawing change of the object in the document. For example, if a user request includes increasing the size of an object, the size of the object will be increased to a size indicated in the user request.

At block 206, responsive to changing the parameter associated with the drawing function, processing logic sends an indication that the suggested drawing change has been applied. In some embodiments, processing logic uses a description associated with the drawing function selected in the user request to generate a natural language comment indicating application of the suggested change. In some embodiments, processing logic generates a natural language comment prompting another user (e.g., contributor, collaborator, etc.) whether change associated with the drawing function correctly applied the suggested change. In some embodiments, the processing logic sends a drawing document with the changed parameter to indicated that he suggested drawing change has been applied. In some embodiments, actions taken by a user are tracked and used as input into a machine learning model to generate a natural language description of the users actions to indicate the suggested change has been applied. In some embodiments, the indication sent comprises a request for a user response indicating that the suggested change has been applied as intended by the original comment.

FIG. 3 is an exemplary illustration of a training phase of a machine learning system, in accordance with some implementation of the present disclosure. Machine learning system 170 may use method 300 to at least one of train, validate, or test a machine learning model, in accordance with embodiments of the disclosure. In some embodiments, one or more operations of method 300 may be performed by data set generator 174 of server machine 172 as described with respect to FIG. 1. It may be noted that components described with respect to FIG. 1 may be used to illustrate aspects of FIG. 3.

Referring to FIG. 3, in some embodiments, at block 301 the processing logic implements method 300 initializes a training set T to an empty set.

At block 302, processing logic identifies a first data input (e.g. first training input, first validating input) that includes a first set of suggested drawing changes to an object (as described with respect to FIG. 1). The first data input may include comments including the first set of suggested drawing changes. In some embodiments, the first data input may comprise any subset of words or language elements found in content of a comment. In some embodiments, the processing logic generates a second data input comprising additional information regarding the object. For example, the second data input may comprise the name, datatype, or location of the object. The first target input may be identified from the old comments 144 of the historical data 142 (e.g., stored in the data store 140).

At block 303, processing logic identifies a first target output for one or more of the data inputs (e.g., first data input). The first target output provides an indication of a drawing function associated with the suggested drawing of the object found within the comment. The first target input may be identified from the old drawing functions 146 of the historical data 142 (of data store 140).

At block 304, processing logic optionally generate mapping data that is indicative of an input/output mapping. The input/output mapping (or mapping data) may refer to the data input (e.g., one or more of the data inputs described herein), the target output for the data input (e.g. one or more of the data inputs described herein), the target output for the data (e.g. where the target output identifies an associated drawing function), and an association between the data input(s) and the target output.

At block 305, processing logic adds the mapping data generated at block 304 to data set T.

At block 306, processing logic branches based on whether the data set T is sufficient for at least one of training, validating, or testing machine learning model 190. If so ("yes" branch), execution proceeds to block 307, otherwise ("no" branch), execution continues back at block 302. It should be noted that in some embodiments, the sufficiency of data set T may be determined based simply on the number of input/output mappings in the data set, while in some other embodiments, the sufficiency of data set T may be determined based on one or more other criteria (e.g., a measure of diversity of the data examples, accuracy, etc.) in addition to, or instead of, the number of input/output mappings.

At block 307, processing logic provides data set T to train, validate, or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs) are input to the neural network, and output values (e.g., numerical values associated with target outputs) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 307, machine learning model (e.g., machine learning model 190) can be at least one of trained using training engine 182 of server machine 180, validated using validating engine 184 of server machine 180, or tested using testing engine 186 of server machine 180. The trained machine learning model may be implemented by function identification component 194 (of server machine 192) to identify a drawing function based on a suggested change in a comment.

FIG. 4 depicts a flow diagram of one example method 400 for processing suggested drawing changes to identify drawing functions associated with the suggested drawing change using a trained machine learning model, in accordance with some implementation of the present disclosure. Method 400 is performed by processing logic that may comprise hardware (circuitry, dedicated logic, etc.), software (such as is run on a general purpose computer system or a dedicated machine) or combination thereof. In one implementation, the method is performed using the server 120 and the trained machine learning model 190 of FIG. 1, while in some other implementations, one or more blocks of FIG. 4 may be performed by one or more other machines not depicted in the figures.

Method 400 may include receiving an input comment (e.g., from a user device or a server such as 112 or 120 of FIG. 1) and processing the input comment using a trained model such as trained machine learning model 190. The trained model may be configured to generate, based on a suggest change of the comment, one or more outputs indicating (i) a drawing function associated with the suggested drawing change, and (ii) a level of confidence that the drawing function is associated with the suggested drawing change.

At block 401, a comment may be identified for processing. For example, a comment including natural language input from a collaborator or contributor to a drawing document may be processed (e.g., a recommendation or suggested changes).

At block 402, a suggested drawing change within the comment is identified. For example, a suggested drawing change may include, "make this green," "add more texture," or "make this three-dimensional." In some embodiments, a suggested drawing change may be associated with an object or a location on a drawing workspace.

At block 403, a suggested drawing change of the comment is provided as input to the trained machine learning model, and at block 404, one or more outputs are obtained from the trained machine learning model. At block 405, confidence data is extracted from the output(s) obtained at block 404. In one implementation, the confidence comprises, for each drawing function, a level of confidence that the associated drawing function corresponds to the suggested drawing change. In one example, the level of confidence is a real number between 0 and 1 inclusive. It should be noted that the level of confidence may not be a probability (for example, the sum of the confidences levels for the documents functions may not equal 1).

At block 406, the confidence data is used to estimate one or more drawing functions that have a confidence level that satisfies a threshold condition. In one example, N drawing functions that have N highest levels of confidence may be identified as associated with the suggested changes. In another example, all drawing functions may be identified as associated with the suggested drawing function that have a level of confidence above a particular (e.g., predefined) threshold.

At block 407, the one or more identified drawing functions are provided for presentation to a user. In some embodiments, the one or more identified drawing functions in a method or manner similar to block 203 of FIG. 2. In some embodiments, the drawing functions are presented to the user in rank order by confidence level. In some embodiments, the drawing functions are presented to the user with a visual indicator representing the confidence level associate with each drawing functions. For example, one or more drawing functions with the highest confidence level may be depicted with first color (e.g., green or gold) and one or more drawing with a confidence level close to the threshold level may be depicted with a second color (e.g., yellow or silver). In some embodiments, the drawing functions may be placed in tiers or groups based on the associated confidence levels.

After block 407, execution may continue back to 401 for processing of another comment (e.g. a second comment within the same document, the same comment with a second suggested change, etc.).

Figure 5:
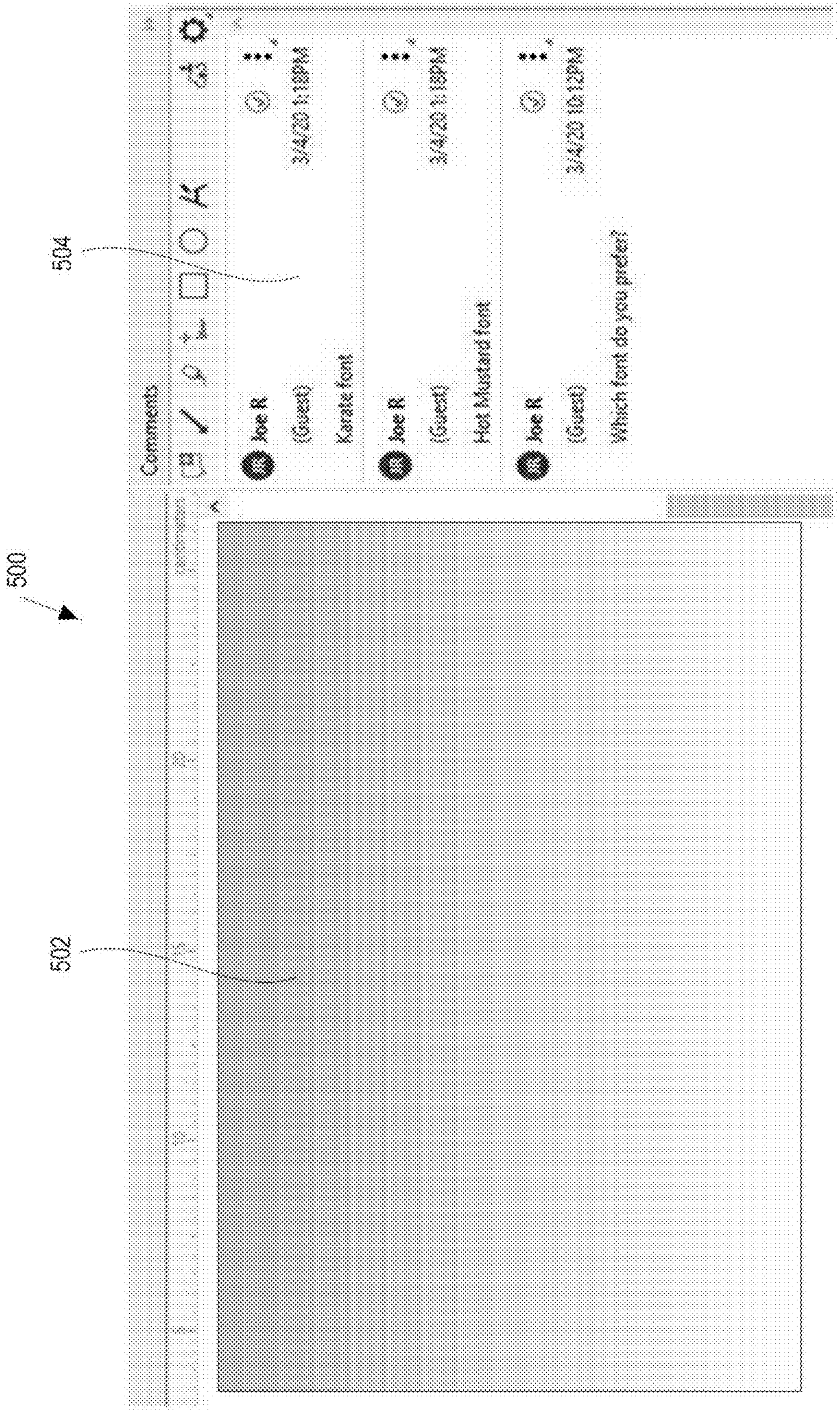
FIG. 5 depicts is an exemplary illustration of a user interface (UI) of a drawing platform, in accordance with some implementation of the present disclosure.

FIG. 5 depicts an exemplary illustration of a UI 500 of a drawing platform, in accordance with some implementation of the present disclosure. The UI 500 may include a collaboration section 504 displaying a plurality of comments (e.g., some of comments 126 of FIG. 1) of a collaboration tool 124. In some embodiments, the comments are displayed with the help of a data container, a tab, a popup, or the like. The UI 500 may comprise a drawing workspace 502 where drawing functions (e.g., drawing functions 130 of FIG. 1) of a drawing tool may be displayed and/or executed. In some embodiments the UI 500 may include separate discrete sections for operations of a drawing tool to be displayed (e.g. drawing objects, graphical design element, etc.) and for operations of a collaboration tool (e.g. comments), while in other embodiments the collaboration tool 124 and the drawing tool may be integrated into a single display. For example, comments may be displayed on a drawing object or within the drawing workspace 502. In some embodiments, the comments may incorporate drawing functions and objects to integrate the functionality of the drawing tool with the collaboration tool. For example, comments may comprise drawing indicators (e.g., arrows, highlights, etc.) to associate the comment with a location of the workspace, an object of the workspace, or the like.

Figure 6:
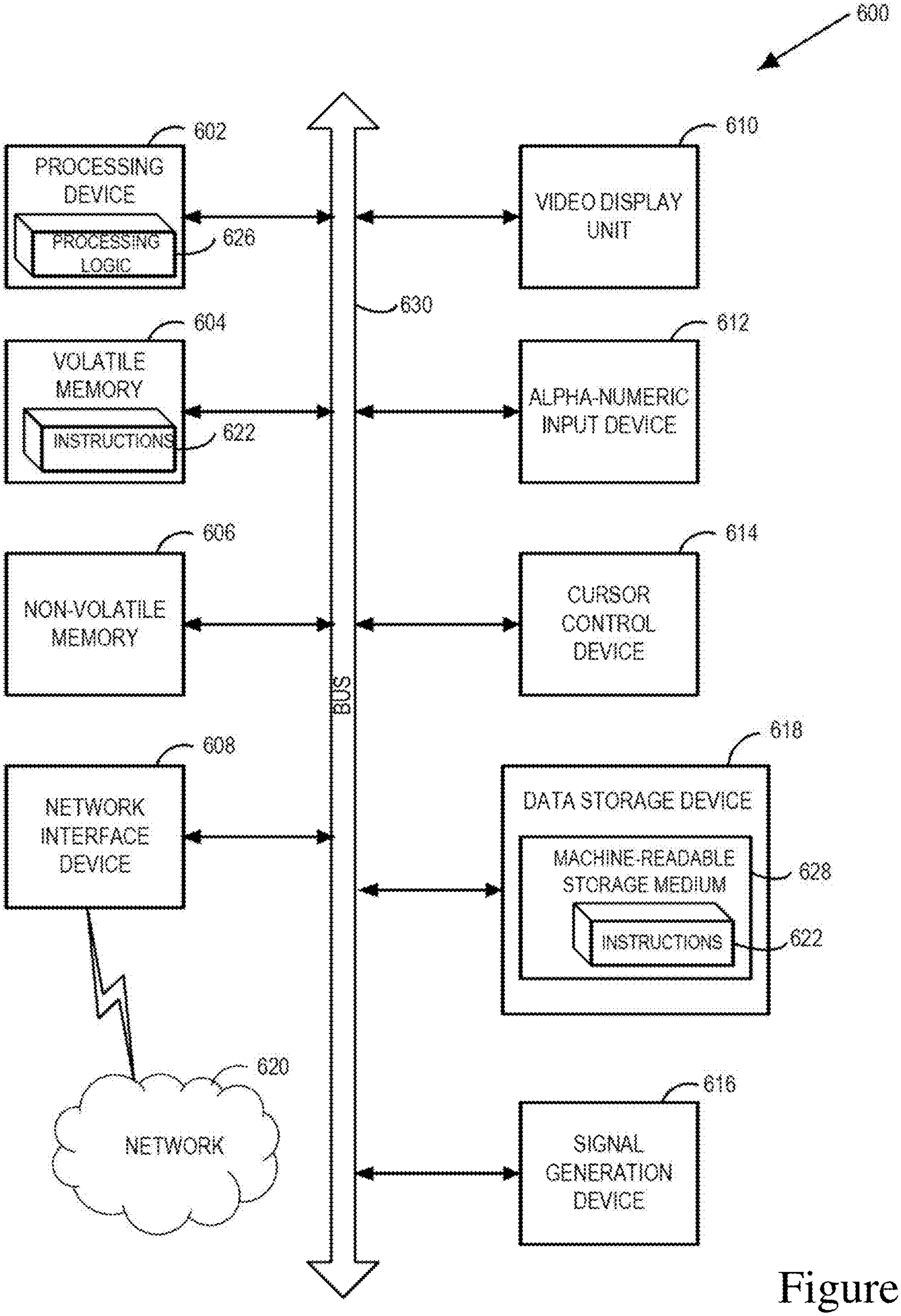
FIG. 6 depicts a block diagram of an example computing device capable of processing comments and identifying associated drawing functions, operating in accordance with one or more aspects of the present disclosure.

FIG. 6 depicts a block diagram of an example computing device capable of processing comments and identifying associated drawing functions, operating in accordance with one or more aspects of the present disclosure. In various illustrative examples, various components of the computing device 600 may represent various components of the client devices 112, server, 120, data store 140, and machine learning system 170, illustrated in FIG. 1.

Example computing device 600 may be connected to other computer devices in a LAN, an intranet, an extranet, and/or the Internet. Computing device 600 may operate in the capacity of a server in a client-server network environment. Computing device 600 may be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 600 may include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which may communicate with each other via a bus 630.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 may be configured to execute instructions implementing methods 200-400 illustrated in FIGS. 2-4.

Example computing device 600 may further comprise a network interface device 608, which may be communicatively coupled to a network 620. Example computing device 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 may include a machine-readable storage medium (or, more specifically, a non-transitory machine-readable storage medium) 628 on which is stored one or more sets of executable instructions 622. In accordance with one or more aspects of the present disclosure, executable instructions 622 may comprise executable instructions associated with executing methods 200-400 illustrated in FIGS. 2-4.

Executable instructions 622 may also reside, completely or at least partially, within main memory 604 and/or within processing device 602 during execution thereof by example computing device 600, main memory 604 and processing device 602 also constituting computer-readable storage media. Executable instructions 622 may further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, compact disc read only memory (CD-ROMs), and magnetic-optical disks, read-only memories (ROMs), random access memories (RAMs), erasable programmable read-only memory (EPROMs), electrically erasable programmable read-only memory (EEPROMs), magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:

establishing a training set of data comprising a set of training inputs and training target outputs;

executing a training engine upon the training set of data to generate a plurality of trained machine learning models where each trained machine learning model of the plurality of trained machine learning models corresponds to a distinct set of features of the training set of data; and determining with a validation engine an accuracy of each trained machine learning model of the plurality of trained machine learning models;

discarding each trained machine learning model of the plurality of trained machine learning models having an accuracy that does not meet a threshold accuracy to form a filtered subset of the plurality of trained machine learning models;

determining with a testing engine an accuracy for each trained machine learning model of the filtered subset of the plurality of trained machine learning models in dependence upon executing the trained machine learning model in the filtered subset of the plurality of trained machine learning models against a set of test data;

establishing the trained machine learning model of the filtered subset of the plurality of trained machine learning models with the highest accuracy as the machine learning model;

providing to the trained machine learning model a new natural language comment comprising another suggested change as input and to produce a new output based on the new input; and rendering to a user a set of functions; wherein the new output comprises:

the set of functions associated with the suggested drawing change produced as the new output; and for each of the function of the set of functions a level of confidence that the corresponding function of the set of functions is associated with the suggested drawing change; and the set of functions are listed in order of their level of confidence.

2. The method according to claim 1, wherein each training input of the set of training inputs comprises a natural language comment.

3. The method according to claim 1, wherein each training input of the set of training inputs comprises a natural language comment comprising a suggested change to a portion of a document rendered within a graphical user interface (GUI) by a software application; and either:

each target output of the set of training target outputs comprises a function selected by a user to apply the suggested change in the natural language comment of a predetermined training input of the set of training inputs and the natural language comment of a predetermined training input of the set of training inputs further comprises one or more indicators that define the portion of the document to which the suggested change should be made; and each target output of the set of training target outputs comprises a function selected by a user to apply the suggested change in the natural language comment of a predetermined training input of the set of training inputs.

4. The method according to claim 1, further comprising receiving, upon a computing device, a natural language comment from a user of the computing device comprising a suggested change to an object within a document, wherein the natural language comment comprises natural language;

processing, upon another computing device, the natural language comment with the trained machine learning model to identify at least a function associated with the suggested change; and rendering, upon the computing device, a modified object within the document where the modified object is the object after the suggested change has been performed upon the object within the document.

5. The method of claim 1, further comprising receiving, upon a computing device, a natural language comment from a user of the computing device comprising a suggested change to an object within a document, wherein the natural language comment comprises natural language;

processing, upon another computing device, the natural language comment with the trained machine learning model;

obtaining, upon the computing device from the another computing device, one or more outputs of the machine learning model, each output of the one or more outputs indicating another function associated with the suggested change; and a level of confidence that the another function is associated with the suggested change;

determining, upon the computing device, whether the level of confidence for each another function associated with each output of the one or more outputs of the trained machine learning model satisfies a threshold condition; and upon determining that the level of confidence for a function associated with an output of the one or more outputs of the trained machine learning model satisfies the threshold condition establishing that function associated with an output of the one or more outputs of the trained machine learning model as part of the suggested change.

6. The method of claim 1, further comprising receiving, upon a computing device, a natural language comment from a user of the computing device comprising a suggested change to an object within a document, wherein the natural language comment comprises natural language;

processing, upon another computing device, the natural language comment with the trained machine learning model;

obtaining, upon the computing device from the another computing device, one or more outputs of the machine learning model, each output of the one or more outputs indicating another function associated with the suggested change; and a level of confidence that the another function is associated with the suggested change;

determining, upon the computing device, which another function associated of one or more outputs of the trained machine learning model has the highest level of confidence; and establishing the another function associated with an output of the one or more outputs of the trained machine learning model having the highest level of confidence as the suggested change.

7. A method, comprising:

establishing a trained machine learning model;

receiving, by a computing device, a comment comprising a suggested change to an object in a document, wherein the comment comprises natural language;

processing, with the trained machine learning model, the comment to establish one or more functions associated with the suggested change; and presenting a user a list comprising the filtered one or more functions having a level of confidence higher than the threshold condition from which the user selected a function of the one or more functions to applied to the object in the document;

providing to the trained machine learning model a new natural language comment comprising another suggested change as input and to produce a new output based on the new input; and rendering to a user a set of functions; wherein processing the comment to identify the one or more functions associated with the suggested change comprises:

using the suggested change as input to the trained machine learning model;

obtaining an output from the trained machine learning model, the output comprising the one or more functions associated with the suggested change and for each function of the one or more functions a level of confidence that function of the one or more functions associated with the suggested change;

filtering the one or more functions to remove those having a level of confidence that does not satisfy a threshold condition;

the new output comprises:

the set of functions associated with the suggested drawing change produced as the new output; and for each of the function of the set of functions a level of confidence that the corresponding function of the set of functions is associated with the suggested drawing change; and the set of functions are listed in order of their level of confidence.

8. The method according to claim 7, wherein the trained machine learning model was established by a process composing:

establishing a training set of data comprising a set of data inputs and target outputs;

executing a training engine upon the training set of data to generate a plurality of trained machine learning models where each trained machine learning model of the plurality of trained machine learning models corresponds to a distinct set of features of the training set of data; and determining with a validation engine an accuracy of each trained machine learning model of the plurality of trained machine learning models;

discarding trained machine learning model of the plurality of trained machine learning models having an accuracy that does not meet a threshold accuracy to form a filtered subset of the plurality of trained machine learning models; and determining with a testing engine a trained machine learning model of the plurality of trained machine learning models having a highest accuracy in dependence upon executing each trained machine learning model in the filtered subset of the plurality of trained machine learning models against a testing set of data; and establishing the trained machine learning model in the filtered subset of the plurality of trained machine learning models with the highest accuracy as the machine learning model.

9. A method, comprising:

establishing a trained machine learning model;

receiving, by a computing device, a comment comprising a suggested change to an object in a document, wherein the comment comprises natural language;

processing, with the trained machine learning model, the comment to establish one or more functions associated with the suggested change; and automatically applying a selected function of the object in the document when a level of confidence of the selected function exceeds a threshold condition;

providing to the trained machine learning model a new natural language comment comprising another suggested change as input and to produce a new output based on the new input; and rendering to a user a set of functions; wherein processing the comment to identify the one or more functions associated with the suggested change comprises:

using the suggested change as input to the trained machine learning model;

obtaining an output from the trained machine learning model, the output comprising the one or more functions associated with the suggested change and for each function of the one or more functions a level of confidence that function of the one or more functions associated with the suggested change;

establishing the selected function as the function of the one or more functions having the highest level of confidence, the new output comprises:

the set of functions associated with the suggested drawing change produced as the new output; and for each of the function of the set of functions a level of confidence that the corresponding function of the set of functions is associated with the suggested drawing change; and the set of functions are listed in order of their level of confidence.

10. The method according to claim 9, wherein the trained machine learning model was established by a process composing:

establishing a training set of data comprising a set of data inputs and target outputs;

executing a training engine upon the training set of data to generate a plurality of trained machine learning models where each trained machine learning model of the plurality of trained machine learning models corresponds to a distinct set of features of the training set of data; and determining with a validation engine an accuracy of each trained machine learning model of the plurality of trained machine learning models;

discarding trained machine learning model of the plurality of trained machine learning models having an accuracy that does not meet a threshold accuracy to form a filtered subset of the plurality of trained machine learning models; and determining with a testing engine a trained machine learning model of the plurality of trained machine learning models having a highest accuracy in dependence upon executing each trained machine learning model in the filtered subset of the plurality of trained machine learning models against a testing set of data; and establishing the trained machine learning model in the filtered subset of the plurality of trained machine learning models with the highest accuracy as the machine learning model.

* * * * *